(12) United States Patent
Miura

(10) Patent No.: US 6,786,093 B2
(45) Date of Patent: Sep. 7, 2004

(54) BALANCING APPARATUS

(75) Inventor: Hiroki Miura, Tokyo (JP)

(73) Assignee: Kokusai Keisokuki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/439,906

(22) Filed: May 16, 2003

(65) Prior Publication Data

US 2003/0213302 A1 Nov. 20, 2003

(30) Foreign Application Priority Data

May 16, 2002 (JP) ........................................ 2002-141486
Jun. 5, 2002 (JP) ........................................ 2002-164232

(51) Int. Cl.[7] .......................... G01M 1/20; G01M 1/22; G01M 1/38; G01L 25/00
(52) U.S. Cl. ......................... 73/462; 73/1.14; 700/279
(58) Field of Search ..................... 73/460, 462, 471, 73/1.14, 475, 487; 700/279

(56) References Cited

U.S. PATENT DOCUMENTS 3,681,967 A * 8/1972 Hines et al. ................. 73/1.14
4,357,832 A * 11/1982 Blackburn et al. ............ 73/462
4,776,215 A * 10/1988 Curchod ....................... 73/462

* cited by examiner

*Primary Examiner*—Hezron Williams
*Assistant Examiner*—John Hanley
(74) *Attorney, Agent, or Firm*—Pitney Hardin LLP

(57) ABSTRACT

Balancing apparatus that supports and rotates a body to be measured with a rotating mechanism so that the body vibrates due to the dynamic imbalance thereof. The vibration of the body is transmitted to a vibration member and then detected by a sensor. A vibrator is connected to the vibration member. The vibrator applies to the vibration member a vibration that is an inverse of a vibration that will be generated in the vibration member by an ideal body having an ideal dynamic imbalance. By detecting the vibration remaining in the vibration member, the balancing apparatus measures the deviation of the dynamic imbalance of the body from the ideal dynamic imbalance.

18 Claims, 6 Drawing Sheets

BALANCING APPARATUS

BACKGROUND OF THE INVENTION

Figure 1:
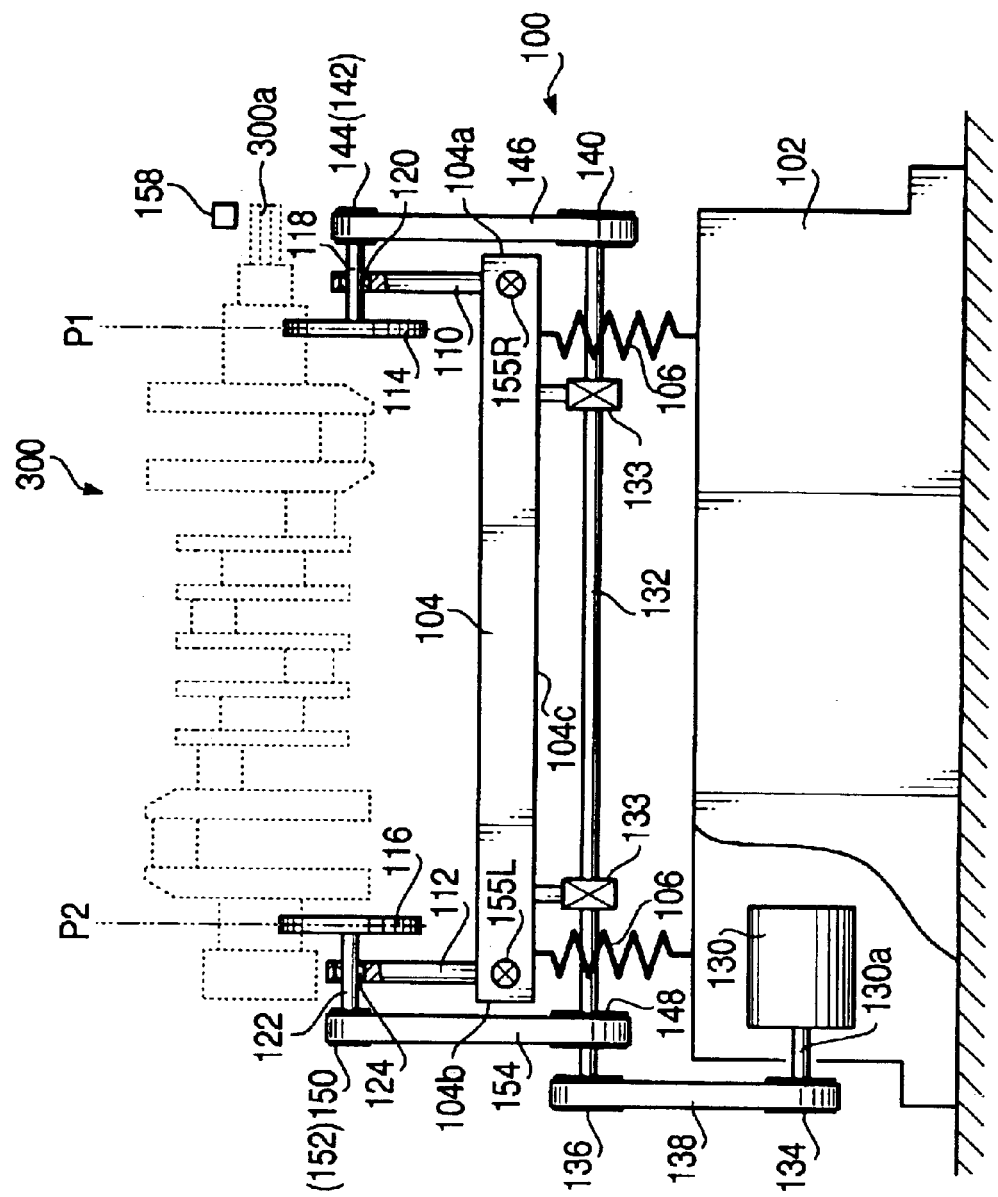

The present invention relates to balancing apparatus that measures dynamic imbalance of a rotating body by detecting vibration transmitted to the balancing apparatus from the rotating body.

Vibration due to imbalance in a rotating body has been a serious problem in many industrial fields. In order to prevent such vibration, it is required to dynamically balance the rotating body.

Some types of rotating body, however, are required to have a certain dynamic imbalance so as to allow a system to which the rotating body belongs being dynamically balanced as a whole. For example, a crank shaft, to which pistons or the like are to be coupled, should have dynamic imbalance that cancels the dynamic imbalance generated by the pistons or the like so that serious vibration does not occur in an engine.

The dynamic imbalance of a rotating body is generally measured with balancing apparatus. The rotating body is dynamically balanced by adding or removing mass thereto so as to cancel the measured imbalance.

If the rotating body is required to have a certain imbalance, mass is added to the rotating body, which mass balances with the desired dynamic imbalance, so that only the deviation of the dynamic imbalance from the desired dynamic imbalance will be measured by the balancing apparatus. For example, if the crank shaft is to be measured, a dummy ring having the same mass as the piston is mounted to each crank pin during the measurement.

The above-mentioned method for measuring dynamic imbalance of a crank shaft, however, requires manually mounting and removing dummy rings whenever a new crank shaft is to be measured, which makes automation of the measuring process difficult, and also increases the time required for the measurement.

Therefore, there is a need for balancing apparatus that is capable of measuring deviation of the dynamic imbalance of a crank shaft from the desired dynamic imbalance thereof without requiring mounting dummy rings to the crank shaft.

Balancing apparatus measures the dynamic imbalance of a rotating body by detecting the vibration transmitted to such balancing apparatus from the rotating body with a vibration pick-up. However, the sensitivity of the vibration pick-up, and also the vibration characteristic of the balancing apparatus, may change over time and in accordance with ambient temperature variation. Accordingly, calibration of the balancing apparatus should be carried out regularly to ensure correct measurement.

Conventionally, calibration of such balancing apparatus is performed by providing to the balancing apparatus a standard rotating body having no dynamic imbalance, attaching a weight of known mass onto the standard body, rotating the standard body to measure the dynamic imbalance thereof, and comparing the measurement result with the dynamic imbalance calculated from the mass and position of the weight attached to the standard body.

However, it is difficult to automate conventional calibration of balancing apparatus, since the calibration process requires manually attaching the weight onto the standard body.

Further, if dynamic imbalance is to be measured for a plurality of balancing planes of the rotating body, the calibration should be carried out for each balancing plane. That is, the calibration should be carried out several times with the weight being attached to the standard body in a different balancing plane each time. In this case, the weight has to be manually attached and removed from the standard body several times which increases the time required for the calibration.

Therefore, there is a need for balancing apparatus that is capable of performing calibration without requiring use of a weight.

In some cases, the vibration characteristic of the balancing apparatus changes significantly, due, for example, to mechanical defects. Since correct measurement of dynamic imbalance cannot be achieved in such cases, there is also a need for balancing apparatus that is capable of automatically detecting such significant changes in vibration characteristic.

SUMMARY OF THE INVENTION

It is therefore an object of the present invention to provide balancing apparatus that is capable of measuring deviation of dynamic imbalance of a rotating body from desired dynamic imbalance thereof without requiring manually mounting a weight to the rotating body.

It is yet another object of the present invention to provide balancing apparatus that is capable of performing calibration thereof without requiring manually mounting a weight to a dynamically balanced rotating body utilized for calibration.

It is yet another object of the present invention to provide balancing apparatus that is capable of automatically detecting abnormal vibration characteristics.

According to an aspect of the present invention, there is provided balancing apparatus for rotating a body to be measured with a rotating mechanism so that the body vibrates due to the dynamic imbalance thereof. The vibration of the body is transmitted to a vibration member and then detected by a sensor. A vibrator is coupled to the vibration member. In one embodiment of the present invention, the vibrator is for canceling a predetermined vibration of the vibration member. For example, the vibrator applies to the vibration member a vibration, which is an inverse of an ideal vibration that will be generated in the vibration member by an ideal body having an ideal dynamic imbalance. In this way, the ideal vibration in the vibration member can be canceled, and by detecting the vibration remaining in the vibration member, the balancing apparatus can determine the deviation of the dynamic imbalance of the body being tested from the ideal dynamic imbalance.

A memory device may be provided to the balancing apparatus for holding data representing vibration, which will be generated in the vibration member by the ideal body, so that the vibrator can easily obtain data necessary for vibrating the vibration member as described above. It should be noted, the data can be prepared and stored into the memory device by mounting the ideal body to the rotating mechanism, rotating the ideal body to cause vibration to the vibration member, and then detecting the vibration of the vibration member by the sensor.

Optionally or additionally, the balancing apparatus may have a processor for carrying out calculation for determining dynamic imbalance of the body from the output of the sensor. The processor also performs modification of a coefficient utilized in the above-mentioned calculation. As is well known to those skilled in the art, the modification of such a coefficient can be achieved by generating vibration in the vibration member with a rotating body having known dynamic imbalance, and determining the magnitude of the output of the sensor detecting the vibration of the vibration member. In the balancing apparatus of the present invention, however, the modification of the coefficient is carried out by utilizing a dynamically balanced reference body, instead of a body having known dynamic imbalance. A reference vibration is further applied to the vibration member by the vibrator. The reference vibration is substantially identical to a vibration that will be caused to the vibration member by rotating the reference body carrying a predetermined weight at a predetermined location. The data for generating such reference vibration may be held in a memory device of the balancing apparatus.

In the balancing apparatus arranged as described above, the modification of the coefficient, or calibration of the balancing apparatus, can be performed without actually attaching the weight to the reference body, which allows not only shortening of time required for the calibration but also automation of the calibration.

Optionally or additionally, the balancing apparatus may have a controller for determining whether the balancing apparatus has a defect that seriously reduces the vibration transmitted from the body to the sensor. The controller determines whether such a defect exists based on vibration detected by the sensor while the vibrator is applying a reference vibration to the vibration member, which reference vibration may be generated based on data held in a memory device of the balancing apparatus.

According to another aspect of the present invention, balancing apparatus is provided that includes a rotating mechanism for rotating a body to be measured, a vibration member for being vibrated by the body being rotated by the rotating mechanism, a sensor for detecting vibration of the vibration member, a memory device for holding data of the vibration detected by the sensor, a vibrator coupled to the vibration member to apply vibration thereto, and a controller having first and second operation modes. In the first operation mode, the controller stores data of the vibration detected by the sensor into the memory device while keeping the vibrator but of operation. In the second operation mode, the controller vibrates the vibration member by controlling the vibrator based on the data held the memory device.

In the first operation mode, data on vibration of the vibration member caused by, for example, a body having ideal dynamic imbalance or a body having dynamic imbalance suitable for calibrating the balancing apparatus may be sampled and stored into the memory. In the second operation mode, the above mentioned data can be utilized for vibrating the vibration member so that, for example, only the vibration caused by the deviation of dynamic imbalance of the body from ideal dynamic imbalance thereof remains in the vibration member, or, for generating vibration in the vibration member that is suitable for carrying out calibration of the balancing apparatus.

According to another aspect of the present invention, a method for measuring dynamic imbalance of a body is provided. In this method, a test body having unknown dynamic imbalance is rotated to generate a first vibration in the test body. The first vibration is transmitted from the test body to a vibration member. A second vibration is applied to the vibration member, which second vibration is adjusted to completely cancel vibration generated in the vibration member if the test body has ideal dynamic imbalance. Then, the vibration of the vibration member is detected.

According to another aspect of the present invention, a method for calibrating balancing apparatus is provided, which balancing apparatus applies vibration to a vibration member by rotating a test body, detects the vibration of the vibration member, and carries out a process for determining dynamic imbalance of the test body from the detected vibration. In this method, a reference body, which has no dynamic imbalance, is arranged such that vibration of the reference body transmits to the vibration member. Then, the reference body is rotated. The vibration of the vibration member is detected while applying reference vibration to the vibration member. The reference vibration is substantially identical to vibration that will be generated in the vibration member by rotating the reference body carrying a predetermined weight at a predetermined location. Then, modification of a coefficient utilized in the process for determining the dynamic imbalance is carried out based on the vibration detected while applying reference vibration to the vibration member.

According to another aspect of the present invention, a method for testing balancing apparatus is provided, which balancing apparatus generates vibration in a vibration member by rotating a test body, and determines dynamic imbalance of the test body based on vibration of the vibration member detected by a sensor. In this method, a reference body, which has no dynamic imbalance, is arranged such that vibration of the reference body transmits to the vibration member. The reference body is rotated to cause vibration to the vibration member. The vibration of the vibration member is detected while applying reference vibration to the vibration member. The reference vibration is substantially identical to vibration that will be generated in the vibration member by rotating the reference body carrying a predetermined weight at a predetermined location. Then, it is determined whether the balancing apparatus has a defect that seriously reduces the vibration transmitted from the reference body to the sensor by comparing the vibration detected by the sensor with the reference vibration.

BRIEF DESCRIPTION OF THE ACCOMPANYING DRAWINGS

Figure 2:
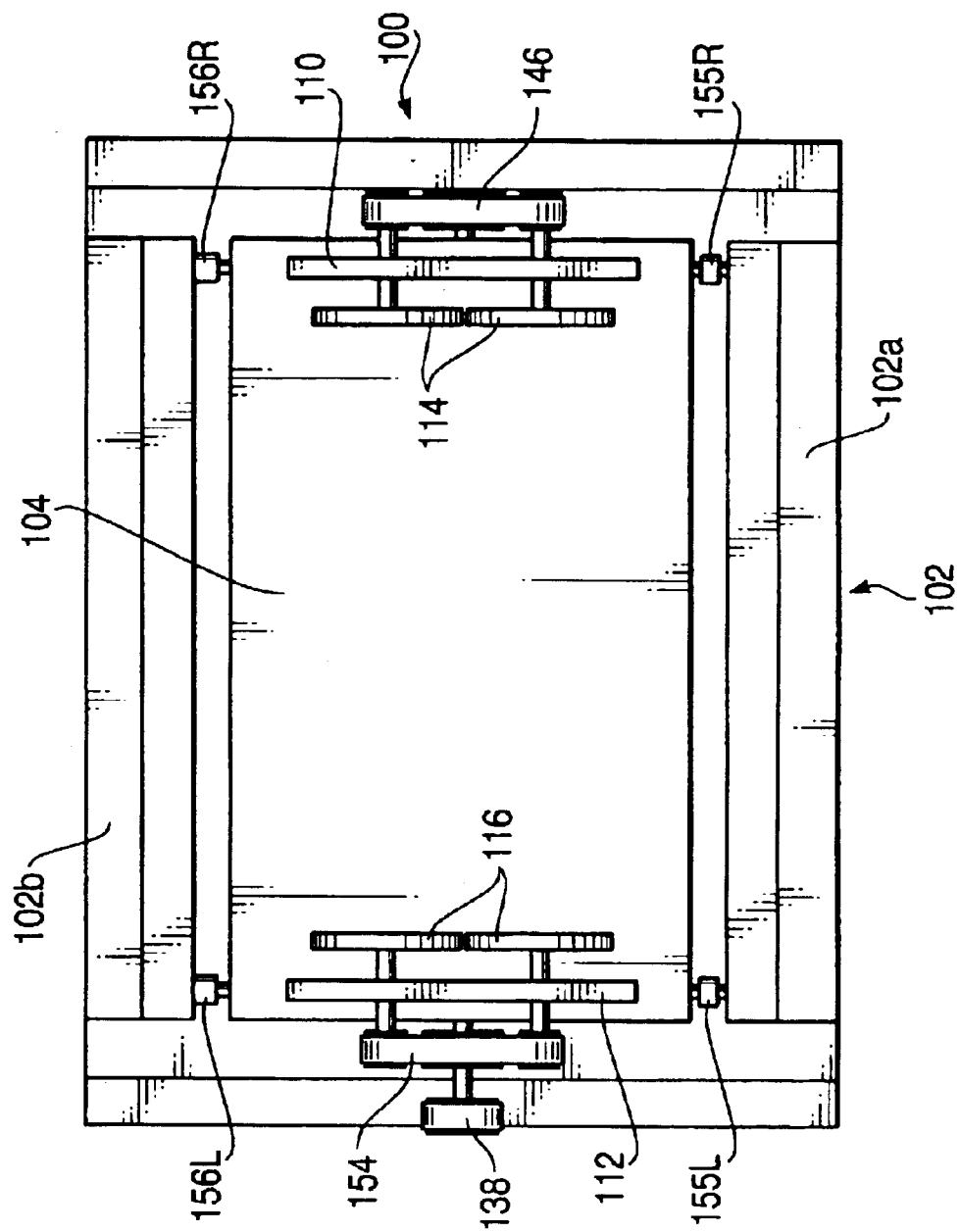
Figure 3:
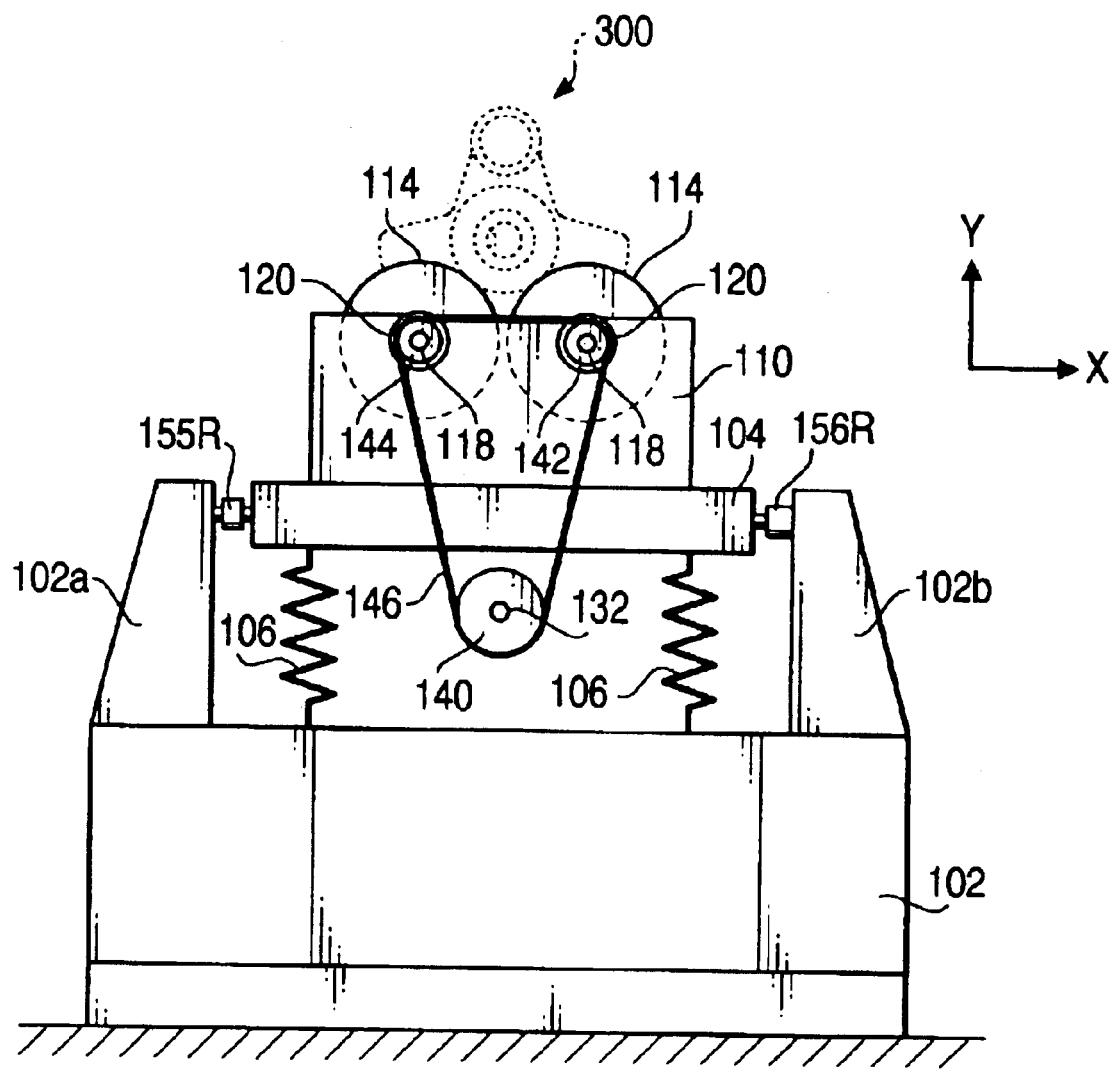
Figure 4:
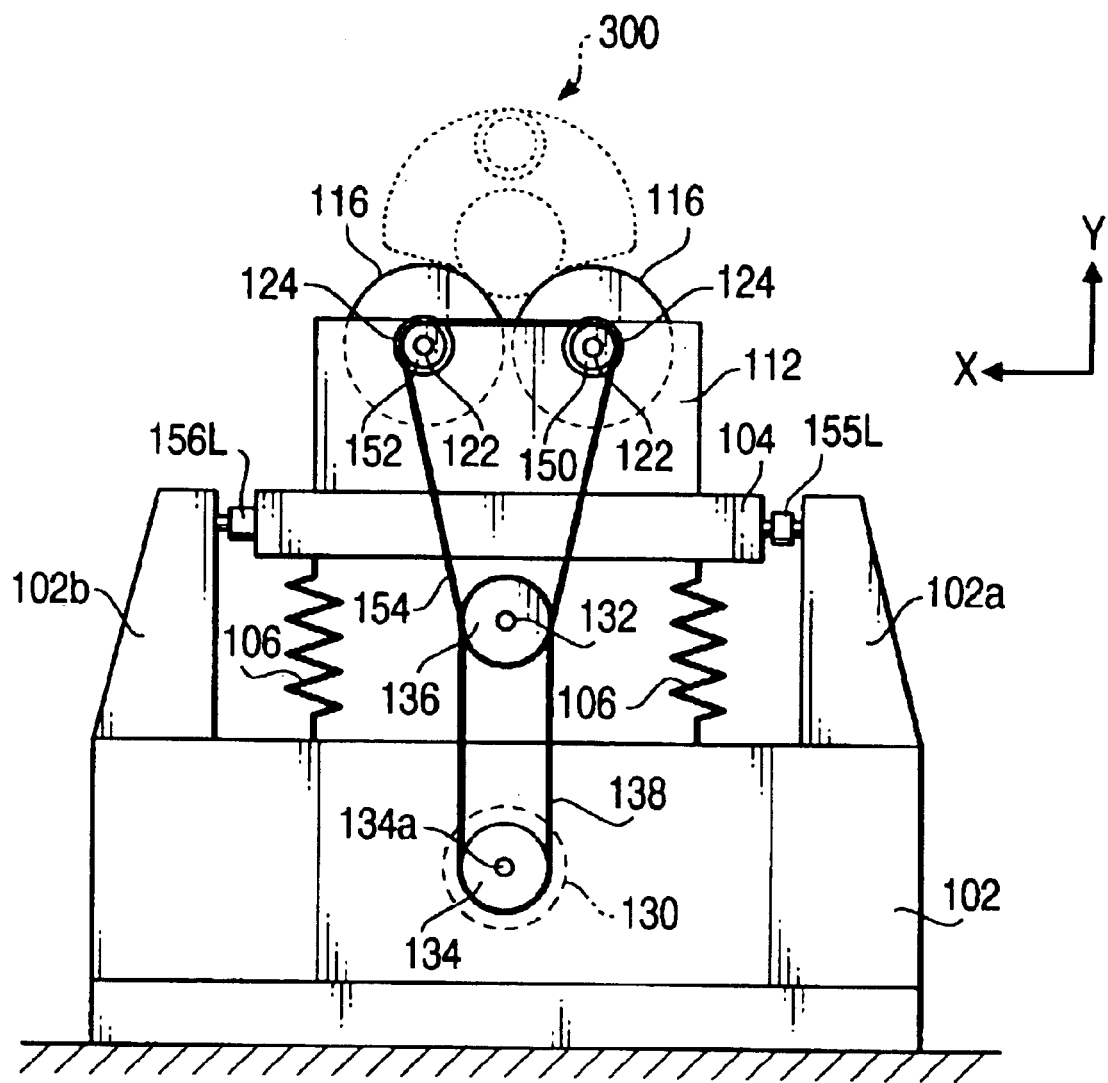
Figure 5:
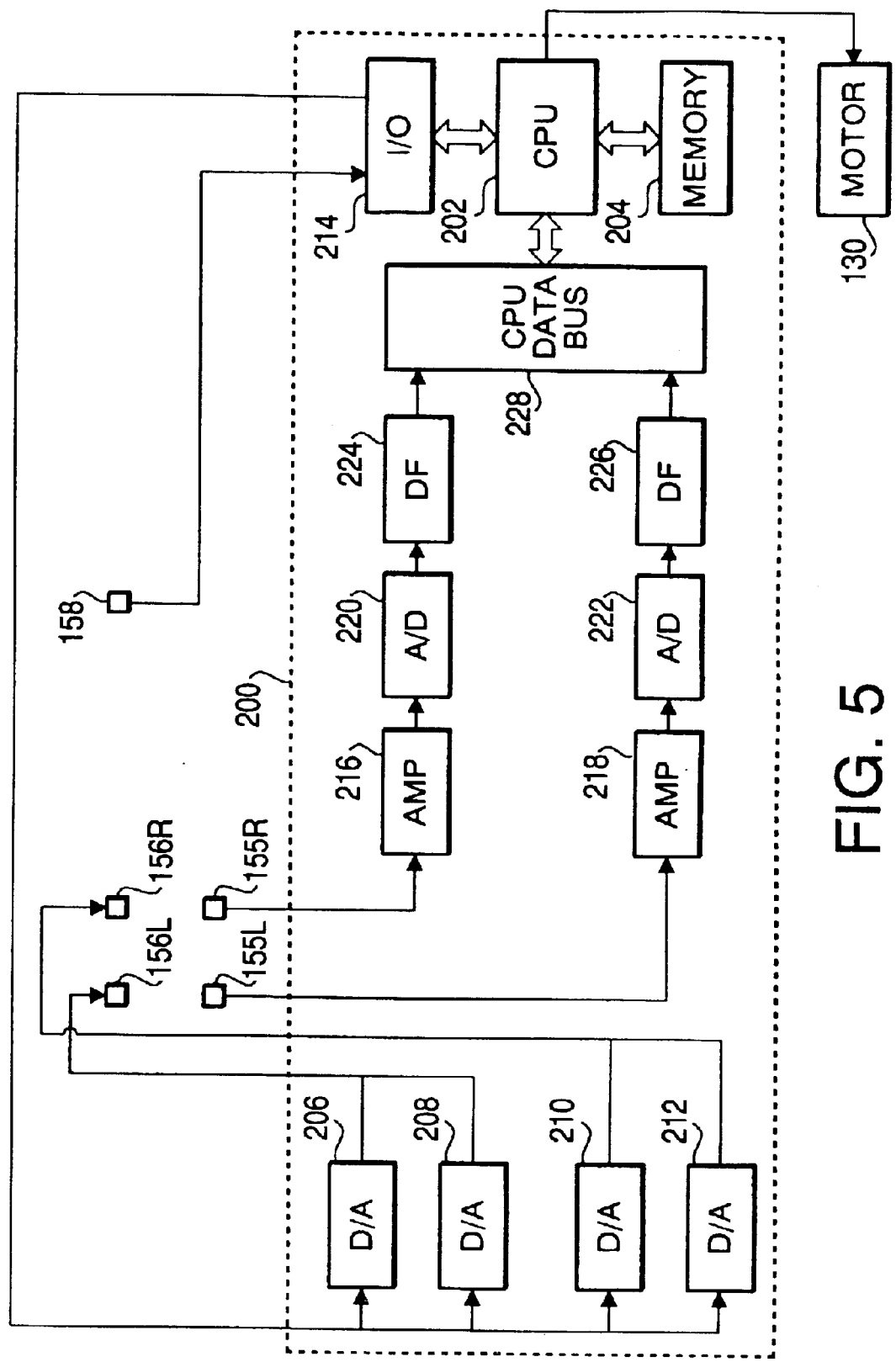
Figure 6:
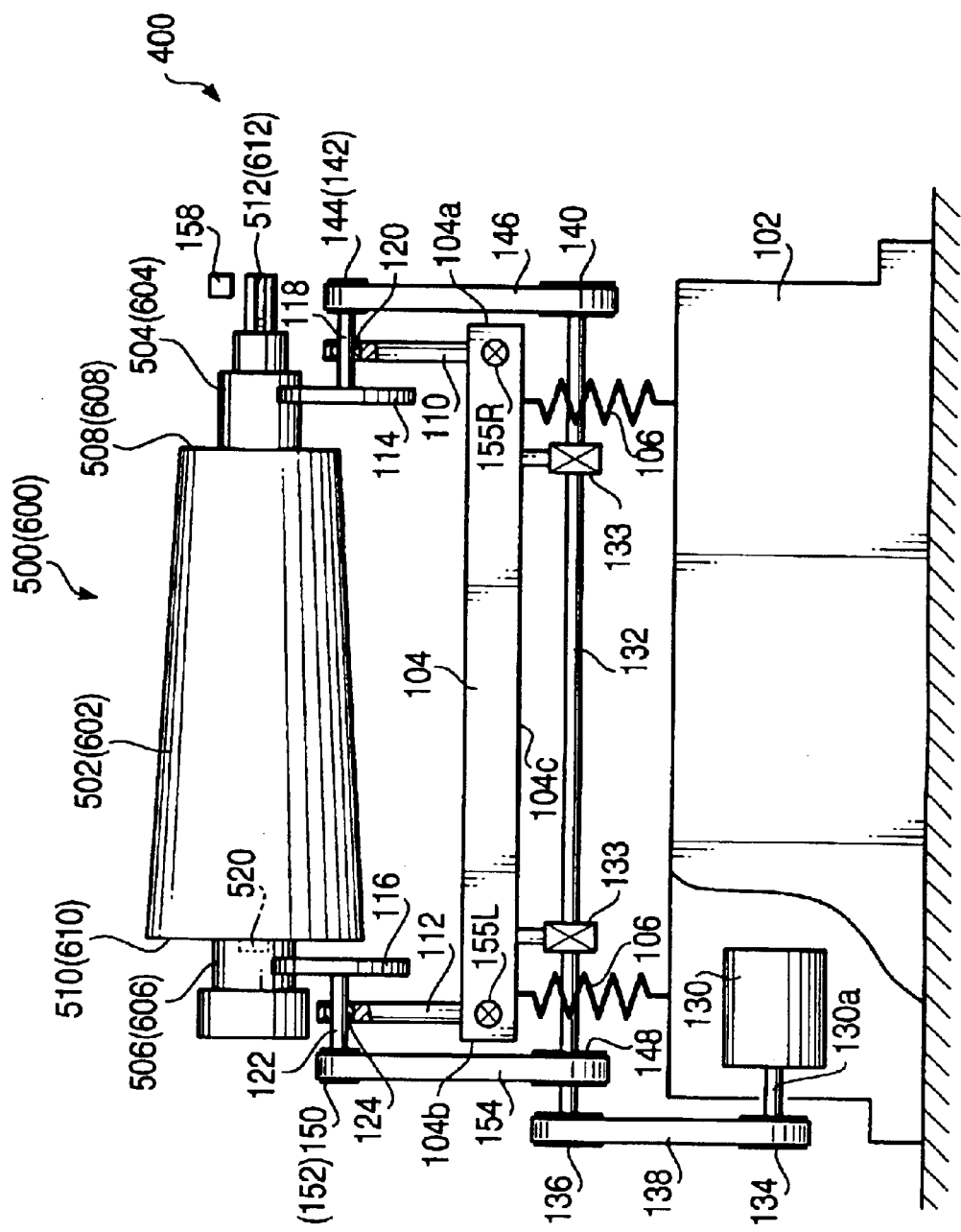

FIGS. 1 and 2 respectively schematically show front and top views of the balancing apparatus of a first embodiment of the present invention;

FIGS. 3 and 4 respectively show right and left side views of the balancing apparatus shown in FIGS. 1 and 2;

FIG. 5 shows a block diagram of a controller provided to the balancing apparatus of the first embodiment of the present invention; and FIG. 6 shows a front view of the balancing apparatus of a second embodiment of the present invention.

DETAILED DESCRIPTION OF THE EMBODIMENTS

The present invention will be described below with reference to the embodiments shown in the drawings.

FIGS. 1 and 2 respectively schematically show front and top views of the balancing apparatus of a first embodiment of the present invention, and FIGS. 3 and 4 respectively show right and left side views of the balancing apparatus 100 shown in FIGS. 1 and 2.

The balancing apparatus 100 is adapted to measure dynamic imbalance of a crank shaft 300, as shown in FIG. 1. The balancing apparatus 100 is provided with a base 102 having first and second upwardly extending side walls 102a and 102b (not shown in FIG. 1, see FIGS. 2 to 4) and a rigid table 104. The table 104 is supported on the base 102 between the side walls 102a and 102b by means of a plurality of springs 106 so that the table 104 can vibrate in a substantially horizontal plane. The table 104 is provided with right and left rigid table walls 110 and 112 mounted on the table 104 near right and left sides 104a and 104b of the table 104, respectively.

The balancing apparatus 100 has also first and second pairs of rollers 114 and 116 that are arranged to rotatably support the crank shaft 300 in first and second measuring planes P1 and P2, respectively, which planes are perpendicular to a rotation axis of the crank shaft 300. The first pair of rollers 114 are connected to a first pair of driven shafts 118 that are held with a pair of bearings 120 provided to the right table wall 110. Similarly, the second pair of rollers 116 are connected to a second pair of driven shafts 122 that are held with a pair of bearings 124 mounted to the left table wall 112. Thus, the first and second pairs of rollers 114 and 116 are respectively rotatably supported by the right and left table walls 110 and 112.

The first and second pairs of rollers 114 and 116 are rotatably driven by a driving mechanism that includes a motor 130 provided to the base 102, and a driving shaft 132 rotatably held below the table 104 by means of a plurality of bearings 133 mounted on an under surface 104c of the table 104.

The motor 130 has a spindle shaft 130a that is coupled to the driving shaft 132 by means of a first pulley 134 fixed to the spindle shaft 130a, a second pulley 136 fixed to the left end of the driving shaft 132, and a first endless belt 138 placed around the first and second pulleys 134 and 136.

Referring to FIGS. 1 and 3, the driving shaft 132 is further coupled to the first pair of driving shafts 118 by means of third, fourth and fifth pulleys 140, 142 and 144 and a second endless belt 146. The third pulley 140 is fixed to the right end of the driving shaft 132 while the fourth and fifth pulleys 142 and 144 are fixed to the first pair of driven shafts 118 at ends thereof opposite to the first pair of rollers 114. The second endless belt 146 is placed around the third, fourth and fifth pulleys 140, 142 and 144 to transmit the rotation of the driving shaft 132 to the first pair of rollers 114.

Referring to FIGS. 1 and 4, the driving shaft 132 is also coupled to the second pair of driven shafts 122 by means of a sixth pulley 148 fixed to the driving shaft 132 near the second pulley 136, seventh and eighth pulleys 150 and 152 fixed to the second pair of driven shafts 122 at ends thereof opposite to the second pair of rollers 116, and a third endless belt 154 placed around sixth, seventh and eighth pulleys 148, 150 and 152.

When the balancing apparatus 100 is arranged as described above, the driving force generated by the motor 130 is first transmitted to the driving shaft 132 via the first endless belt 138. Then, the driving force is transmitted to the first and second pairs of driven shafts 118 and 122 via the second and third endless belts 146 and 154. As a result, both the first and second pairs of rollers 114 and 116 rotate in the same direction with the same rotational speed and make the crank shaft 300 placed thereon rotate.

Referring now to FIGS. 1 and 2, the balancing apparatus 100 is further provided with right and left vibration pick-ups 155R and 155L placed between the first side wall 102a and the table 104. The right and left vibration pick-ups 155R and 155L are adapted to detect the vibration of the table 104 in a plane perpendicular to the rotation axis of the crank shaft 300, namely in a plane parallel to the first and second measuring planes P1 and P2. Each of the right and left vibration pick-ups 155R and 155L detects the accelerated velocity of the table 104 in two orthogonal directions. In the present embodiment, the two orthogonal directions are indicated in FIG. 3 by arrows Y and X, respectively. The right and left vibration pick-ups 155R and 155L are located so as to detect the vibration of the table 104 near the right and left table walls 110 and 112, respectively. Typically, the right (left) vibration pick-up 155R (155L) is attached to the side surface of the table 104 so that the right (left) vibration pick-up 155R (155L) and the right (left) table wall 110 (112) are on the same line perpendicular to the rotation axis of the crank shaft 300.

It should be noted that since the first pair of rollers 114 supports the crank shaft 300 in the first measuring plane P1, the vibration of the crank shaft 300 in the first measuring plane P1 transmits to the table 104 through the first pair of rollers 114 and the right table wall 110. Thus, the right vibration pick-up 155R attached to the table 104 near the right table wall 110 detects the vibration of the crank shaft 300 in the first measuring plane P1. Similarly, the left vibration pick-up 155L attached to the table 104 near the left table wall 112 detects the vibration of the crank shaft 300 at the second measuring plane P2, in which the second pair of rollers 116 supports the crank shaft 300.

The balancing apparatus 100 is also provided with right and left piezoelectric actuators 156R and 156L placed between the second side wall 102b and the table 104 in order to vibrate the table 104. Each of the right and left piezoelectric actuators 156R and 156L is configured so as to vibrate in two orthogonal directions in a plane parallel to the measuring planes P1 and P2. In the present embodiment, the two orthogonal directions are respectively the X and Y directions, and are indicated by the arrows X and Y in FIG. 3. The right and left piezoelectric actuators 156R and 156L are attached to the table 104 near the right and left table walls 110 and 112, respectively. Typically, the right (left) piezoelectric actuator 156R (156L) is attached to a side surface of the table 104 so that the right (left) piezoelectric actuator 156R (156L) and the right (left) table wall 110 (112) are arranged on the same line perpendicular to the rotation axis of the crank shaft 300.

The balancing apparatus 100 is further provided with a sensor 158 that is located adjacent an end portion of the crank shaft 300, and outputs a pulse signal whenever a keyway 300a formed at the end portion of the crank shaft 300 passes by the sensor 158 as the crank shaft 300 rotates.

Further, the balancing apparatus 100 is provided with a controller 200 (not shown in FIGS. 1 to 4) for controlling the operation of the balancing apparatus 100.

FIG. 5 shows a block diagram of a controller 200 of the balancing apparatus 100 of the first embodiment of the present invention.

The controller 200 has a central processing unit (CPU) 202, a memory device 204, an input/output (I/O) port 214, and first, second, third and fourth digital to analog (D/A) converters 206, 208, 210 and 212. The controller 200 further has first and second amplifiers 216 and 218, first and second analog to digital (A/D) converters 220 and 222, first and second digital filters 224 and 226, and a CPU data bus 228.

The first and second amplifiers 216 and 218 amplify the analog output signals of the right and left vibration pick-ups 155R and 155L, respectively. The first and second A/D converters 220 and 222 covert the analog output signals of the first and second amplifiers 216 and 218, respectively, into digital signals. The first and second digital filters 224 and 226 reduce the noise of the digital signals from the first and second A/D converters 220 and 222 and send them to the CPU data bus 228.

The CPU 202 stores the digital data on the CPU data bus 228 into the memory device 204. The CPU 202 also generates vibration signals based on the data held in the memory device 204 and sends them to the right and left piezoelectric actuators 156R and 156L via the I/O port 214 and first, second, third and fourth D/A converters 206, 208, 210 and 212 in order to control the actuation of the piezoelectric actuators 156R and 156L and thereby control the vibration of the table 104. The CPU 202 also generates control signals for controlling the actuation of the motor 130.

Hereinafter, the operation of the balancing apparatus 100 will be described. The balancing apparatus 100 has two operation modes, i.e., an ideal vibration data sampling mode and a measuring mode. In ideal vibration data sampling mode, vibration of an ideal crank shaft having an ideal dynamic imbalance is measured and data obtained thereby is stored into the memory device 204. In measuring mode, the deviation of the dynamic imbalance of a test crank shaft (for which the dynamic imbalance is unknown) from the ideal dynamic imbalance of the ideal crank shaft is measured.

In ideal vibration data sampling mode, the ideal crank shaft is placed on the first and second pairs of rollers 114 and 116. Then the motor 130 is actuated to rotate the first and second pairs of rollers 114 and 116 and hence the ideal crank shaft. The CPU 202 controls the motor 130 based on the pulse signals generated by the sensor 158 so that the ideal crank shaft rotates at a predetermined revolving speed of N revolutions per minute (rpm).

The rotating ideal crank shaft vibrates due to the dynamic imbalance thereof. The vibration of the ideal crank shaft is transmitted through the rollers 114 and 116 and the right and left table walls 110 and 112 and causes the table 104 to vibrate. The vibration caused to the table 104 by the ideal crank shaft as described above will be referred to hereinafter as "ideal vibration".

Note that the right and left piezoelectric actuators 156R and 156L are not actuated during the ideal data sampling mode to ensure that the vibration of the table 104 is caused only by the vibration of the ideal crank shaft.

The ideal vibration of the table 104 is detected by the right and left vibration pick-ups 155R and 155L. The CPU 202 receives data corresponding to the ideal vibration from the right and left vibration pick-ups 155R and 155L through the first and second A/D converters 220 and 222 for one revolution of the ideal crank shaft, and stores the data into the memory device 204.

More specifically, the left vibration pick-up 155L detects accelerated velocities in X and Y directions of the table 104 in the vicinity of the left table wall 112 and generates X and Y analog left vibration signals $W_{LX}$ and $W_{LY}$ corresponding to the detected X and Y accelerated velocities. The X and Y analog left vibration signals $W_{LX}$ and $W_{LY}$ pass through the first amplifier 216 and then enter the first A/D converter 220 to be converted into X and Y digital left vibration signals $W'_{LX}$ and $W'_{LY}$. Then, the X and Y digital left vibration signals $W'_{LX}$ and $W'_{LY}$ are sent to the CPU data bus 228 through the first digital filter 224, which reduces the noise of the digital signals, so that the CPU 202 can capture data corresponding to the digital vibration signals $W'_{LX}$ and $W'_{LY}$.

Similarly, the right vibration pick-up 155R detects accelerated velocities in X and Y directions of the table 104 in the vicinity of the right table wall 110 and sends X and Y analog right vibration signals $W_{RX}$ and $W_{RY}$ to the second A/D converter 222 through the second amplifier 218. The second A/D converter 222 converts the X and Y analog right vibration signals $W_{RX}$ and $W_{RY}$ into X and Y digital right vibration signals $W'_{RX}$ and $W'_{RY}$ and then sends them to the CPU data bus 228 through the second digital filter 226, so that the CPU 202 can capture data corresponding to the X and Y digital right vibration signals $W'_{RX}$ and $W'_{RY}$.

The CPU 202 monitors the pulse signals generated by the sensor 158 and stores, into the memory device 204, data of each of the digital signals $W'_{LX}$, $W'_{LY}$, $W'_{RX}$, and $W'_{RY}$ during the period between two consecutive pulse signals. In this manner, the CPU 202 creates four sets of digital data in the memory device 204. The two sets represent one cycle of the vibration detected by the right vibration pick-up 155R in the X and Y directions (which will be referred to hereinafter as X and Y ideal right vibration data). The other two sets represent one cycle of the vibration detected by the left vibration pick-up 155L in the X and Y directions (which will be referred to hereinafter as X and Y ideal left vibration data).

In the measuring mode, a test crank shaft having unknown dynamic balance is placed on the first and second pairs of rollers 114 and 116 and rotated by the predetermined revolving speed of N rpm. As a result, the test crank shaft vibrates due to the unknown dynamic balance thereof and, in turn, causes the table 104 to vibrate.

Then, the CPU 202 generates first and second vibration signals for controlling the actuation of the left piezoelectric actuator 156L in the X and Y directions, respectively, and provides the first and second vibration signals to the left piezoelectric actuator 156L through the first and second D/A converters 206 and 208, respectively. Further, the CPU 202 generates third and fourth vibration signals for controlling the actuation of the right piezoelectric actuator 156R in the X and Y directions, respectively, and provides the third and fourth vibration signals to the right piezoelectric actuator 156R through the third and fourth D/A converters 210 and 212, respectively.

The first, second, third and fourth control signals are respectively generated based on the X and Y ideal left vibration data and the X and Y ideal right vibration data held in the memory device 204, and are provided to the right and left piezoelectric actuators 156L and 156R in synchronization with the pulse signals from the sensor 158, so that the resultant vibration of the table 104 is the inverse of the ideal vibration. That is, if the ideal vibration can be represented by a function $f=f(\theta)$, where $\theta$ indicates the phase of the vibration (or the rotation angle of the crank shaft), the first, second, third and fourth control signals actuate the right and left piezoelectric actuators 156L and 156R so that a vibration of the table 104 represented by a function $f=-f(\theta)$ is generated.

While the right and left piezoelectric actuators 156R and 156L vibrate the table 104 as described above, the right and left vibration pick-ups 155R and 155L detect the vibration of the table 104.

If the test crank shaft has the same dynamic imbalance as the ideal crank shaft, the vibration caused by the test crank shaft is canceled by the inverse vibration generated by the right and left piezoelectric actuators 156R and 156L. Thus, the right and left vibration pick-ups 155R and 155L detect no vibration of the table 104.

If the dynamic imbalance of the test crank shaft differs from that of the ideal crank shaft, the right and left piezoelectric actuators 156R and 156L cannot completely cancel the vibration generated by the test crank shaft. Thus, the table 104 vibrates due to the deviation of the dynamic imbalance of the test crank shaft from that of the ideal crank shaft.

The right and left vibration pick-ups 155R and 155L detect the vibration of the table 104 caused by the deviation of the dynamic imbalance from that of the ideal crank shaft, and generate analog signals in accordance therewith. The generated analog signals are, in turn, amplified by the first and second amplifiers 216 and 218 and then converted into digital signals by the first and second A/D converters 220 and 222. The CPU 202 stores the digital data coming from the A/D converters 202 and 222 into the memory device during the period between two consecutive pulse signals generated by the sensor 158 in accordance with rotation of the test crank shaft.

In this way, data is stored in the memory device 204 that represents the deviation of dynamic imbalance of the test crank shaft from that of the ideal crank shaft.

FIG. 6 shows a front view of balancing apparatus 400 of a second embodiment of the present invention. The balancing apparatus 400 is adapted to measure dynamic imbalance of a rotating body 500. The balancing apparatus 400 of the second embodiment has substantially the same configuration as the balancing apparatus 100 of the first embodiment of the present invention. However, it operates in different way. Accordingly, only the operation of the balancing apparatus 400 of the second embodiment will be described hereinafter.

The balancing apparatus 400 of the second embodiment has four operation modes, i.e., a reference data sampling mode, a test mode, a calibration mode, and a measuring mode.

In reference data sampling mode, the table 104 is vibrated by a reference body 600 provided with a weight having a known mass W at a predetermined location and data corresponding to the vibration of the table 104, namely a reference vibration, is sampled. The reference body 600 is a dynamically balanced body of the same type as the test body 500. Note that, as shown in FIG. 6, the test body 500 (and hence the reference body 600) utilized in the present embodiment has a main portion 502(602), right and left supporting portion 504 and 506 (604 and 606) protruding from the right end 508(608) and left end 510(610) of the main portion 502(602), and a keyway 512(612) formed on the circumferential surface of an end portion of the body 500 (or the reference body 600).

In reference data sampling mode, the reference body 600 is placed on the first and second pairs of rollers 114 and 116 so as to be supported at the right and left supporting portions 504 and 506 and rotated by a predetermined revolving speed of N rpm. Since the reference body 600 is dynamically balanced, it does not cause the table 104 to vibrate.

While the reference body 600 is rotated, zeroing adjustments of the right and left vibration pick-ups 155R and 155L are carried out by adjusting the gain of the first and second amplifiers 216 and 218.

After achieving the zeroing adjustment of the right and left vibration pick-ups 155R and 155L, the rotation of the reference body 600 is temporarily stopped in order to attach the weight. The weight is attached on an outer edge of the left end 510 of the main portion 502 at the same circumferential location as the keyway 512, for example, as shown in FIG. 6 in broken lines 620.

Then, the reference body 600 is rotated again at the revolving speed of N rpm. This time, the reference body 600 vibrates due to the dynamic imbalance caused by the weight. As a result, the table 104 also vibrates.

The left vibration pick-up 155L detects the vibration in X and Y directions of the table 104 in the vicinity of the left table wall 112 and outputs X and Y analog vibration signals $W_{LX}(\theta)$ and $W_{LY}(\theta)$, where $\theta$ represents the phase of the X and Y analog vibration signals, or the rotating angle of the reference body 600 from the position at which the sensor 158 detects the keyway 612.

The X and Y analog vibration signals $W_{LX}(\theta)$ and $W_{LY}(\theta)$ pass through the second amplifier 218 and then enter the second A/D converter 222 to be converted into X and Y digital vibration signals $W'_{LX}(\theta)$ and $W'_{LY}(\theta)$. Then, the X and Y digital vibration signals $W'_{LX}(\theta)$ and $W'_{LY}(\theta)$ are sent to the CPU data bus 228 through the second digital filter 226.

Similarly, the right vibration pick-up 155R detects the vibration in X and Y directions of the table 104 in the vicinity of the right table wall 110 and outputs X and Y analog vibration signals $W_{RX}(\theta)$ and $W_{RY}(\theta)$ to the first A/D converter 220 through the first amplifier 216. The first A/D converter 220 converts the X and Y analog vibration signals $W_{RX}(\theta)$ and $W_{RY}(\theta)$ into X and Y digital vibration signals $W'_{RX}(\theta)$ and $W'_{RY}(\theta)$ and then outputs them to the CPU data bus 228 through the first digital filter 224.

The CPU 202 stores, into the memory device 204, data of each of the digital vibration signals $W'_{LX}(\theta)$, $W'_{LY}(\theta)$, $W'_{RX}(\theta)$, and $W'_{RY}(\theta)$ during the period between two consecutive pulse signals generated by the sensor 158. Thus, four sets of digital data are created in the memory device 204. Two sets thereof represent one cycle of the vibration of the table 104 in the X and Y directions detected by the left vibration pick-up 155L, which data sets will be referred to hereinafter as X and Y left weight left vibration data, and the other two represent one cycle of the vibration of the table 104 in the X and Y directions detected by the right vibration pick-up 155R (which data sets will be referred to hereinafter as X and Y left weight right vibration data). The four sets of digital data obtained as described above will be utilized in the calibration mode and the test mode.

Next, the weight is moved to the outer edge of the right end 508 of the main portion 502 of the reference body 600 and fixed at the same circumferential location as the keyway 512. Then, the reference body 600 is rotated at N rpm again. The right and left vibration pick-ups 155R and 155L generate the analog vibration signals $W_{LX}(\theta)$, $W_{LY}(\theta)$, $W_{RX}(\theta)$, and $W_{RY}(\theta)$ which are converted into digital vibration signals $W'_{LX}(\theta)$, $W'_{LY}(\theta)$, $W'_{RX}(\theta)$, and $W'_{RY}(\theta)$ and then stored into the memory device 204 for one cycle of the vibration. Thus, another four sets of digital data are created in the memory device 204. The sets obtained from the digital vibration signals $W'_{LX}(\theta)$ and $W'_{LY}(\theta)$ will be referred to hereinafter as X and Y right weight left vibration data, while the other sets obtained from the digital vibration signals $W'_{RX}(\theta)$ and $W'_{RY}(\theta)$ will be referred to hereinafter as X and Y right weight right vibration data. The four sets of digital data obtained as described above will also be utilized in the calibration mode and the test mode.

As is well known to those skilled in the art, dynamic imbalance of the reference body 600 provided with the weight can be represented by two vectors $U_L$ and $U_R$ indicating the magnitudes and angular positions of the dynamic imbalance in two different balancing planes.

The vectors $U_L$ and $U_R$ can be determined from the mass and position of the weight attached to the reference body 600. Further, as also well known in the art, the vectors $U_L$ and $U_R$ can be related to vectors $f_L$ and $f_R$, which represent the magnitudes and directions of the forces exerted on the first and second rollers 114 and 116 by the vibrating reference body 600, using the following equation;

$$\begin{pmatrix} U_L \\ U_R \end{pmatrix} = \begin{pmatrix} a_1 & a_2 \\ a_3 & a_4 \end{pmatrix}^{-1} \begin{pmatrix} f_L \\ f_R \end{pmatrix} \quad (1)$$

where, $a_1$, $a_2$, $a_3$, and $a_4$ are constant coefficients.

If the balancing plane associated with the vector $U_L$ is defined at the left end of the main portion 602 of the reference body 600, while the balancing plane associated with the vector $U_R$ is defined at the right end of the main portion 602, and if the weight is attached only to the left end of the main portion 502, the reference body 600 will only have the dynamic imbalance represented by vector $U_L$. Further, the vectors $f_L$ and $f_R$ can be determined from the X and Y left weight left vibration data and the X and Y left weight right vibration data, respectively. Thus, equation (1) can be rewritten as;

$$\begin{pmatrix} U_{L1} \\ 0 \end{pmatrix} = \begin{pmatrix} a_1 & a_2 \\ a_3 & a_4 \end{pmatrix}^{-1} \begin{pmatrix} f_{L1} \\ f_{R1} \end{pmatrix} \quad (2)$$

where vector $U_{L1}$ indicates the dynamic imbalance determined from the mass and position of the weight attached to the left end of the main portion 602, and $f_{L1}$ and $f_{R1}$ indicate the vectors calculated based on the X and Y left weight left vibration data and the X and Y left weight right vibration data, respectively. From equation (2), the constant coefficients $a_1$ and $a_3$ are obtained as;

$$a_1 = \frac{U_{L1}}{f_{L1}} \quad (3)$$

$$a_3 = \frac{U_{L1}}{f_{R2}} \quad (4)$$

On the contrary, if the weight is attached only at the right end of the main portion 602, the dynamic imbalance of the reference body 600 can be represented only by the vector $U_R$, and the vectors $f_L$ and $f_R$ can be determined from the X and Y right weight left vibration data and the X and Y right weight right vibration data, respectively. Thus, equation (1) can be rewritten as;

$$\begin{pmatrix} 0 \\ U_{R2} \end{pmatrix} = \begin{pmatrix} a_1 & a_2 \\ a_3 & a_4 \end{pmatrix}^{-1} \begin{pmatrix} f_{L2} \\ f_{R2} \end{pmatrix} \quad (5)$$

where vector $U_{R2}$ indicate the dynamic imbalance calculated from the mass and position of the weight attached at the right end of the main portion 602, and $f_{L2}$ and $f_{R2}$ indicate the vectors calculated based on the X and Y right weight left vibration data and the X and Y right weight right vibration data, respectively. From equation (5), the constant coefficients $a_2$ and $a_4$ are obtained as;

$$a_2 = \frac{U_{R2}}{f_{L2}} \quad (6)$$

$$a_4 = \frac{U_{R2}}{f_{R2}} \quad (7)$$

In the vibration data sampling mode, the CPU 202 calculates the constant coefficients $a_1$, $a_2$, $a_3$ and $a_4$ based on the equations (3), (4), (6) and (7) and stores the calculated values into the memory device 204 for later use. Then, the vibration data sampling mode terminates.

The operation of the balancing apparatus 400 in the test mode will now be described. The test mode is carried out in order to check for defects of the balancing apparatus 400 that may seriously reduce transmission of the vibration of the rotating body to the vibration pick-ups 155R and 155L.

In the test mode, the reference body 600 is placed on the first and second pairs of rollers 114 and 116 and rotated at a revolving speed of N rpm. Then, the CPU 202 transfers the X and Y left weight left vibration data to the left piezoelectric actuator 156L through the first and second D/A converters 206 and 208, respectively, in synchronization with the pulse signals from the sensor 158. The CPU 202 also transfers the X and Y left weight right vibration data to the right piezoelectric actuator 156R through the third and fourth D/A converters 210 and 212, respectively, in synchronization with the pulse signals from the sensor 158. As a result, the right and left piezoelectric actuators 156R and 156L cause the table 104 to vibrate, and hence to cause the reference body 600 to vibrate. The vibration caused being substantially identical to the vibration caused by the reference body 600 provided with the weight at the left end of the main portion 602.

In the meantime, the right and left vibration pick-ups 155R and 155L detect the vibration of the table 104. The CPU 202 calculates the deviation of the output signals of the right and left vibration pick-ups 155R and 155L from the X and Y left weight right and left vibration data based on the following equations;

$$\delta_1 = \frac{1}{M} \sum_{m=1}^{M} (W_{LX}(2\pi m/M) - M_{LLX}(2\pi m/M))^2 \quad (8)$$

$$\delta_2 = \frac{1}{M} \sum_{m=1}^{M} (W_{LY}(2\pi m/M) - M_{LLY}(2\pi m/M))^2 \quad (9)$$

$$\delta_3 = \frac{1}{M} \sum_{m=1}^{M} (W_{RX}(2\pi m/M) - M_{LRX}(2\pi m/M))^2 \quad (10)$$

$$\delta_4 = \frac{1}{M} \sum_{m=1}^{M} (W_{RY}(2\pi m/M) - M_{LRY}(2\pi m/M))^2 \quad (11)$$

where $M_{LLX}(2\pi m/M)$ and $M_{LLY}(2\pi m/M)$ represent X and Y left weight left vibration data, respectively, and $M_{LRX}(2\pi m/M)$ and $M_{LRL}(2\pi m/M)$ represent the X and Y left weight right vibration data, respectively. M indicates the number of data samples per revolution of the reference body 600.

The deviations $\delta_1$, $\delta_2$, $\delta_3$ and $\delta_4$ are compared with respective threshold values $Th_1$, $Th_2$, $Th_3$ and $Th_4$, which are determined empirically and vary with the form and size of the reference body 600. When one of the deviations $\delta_1$, $\delta_2$, $\delta_3$ and $\delta_4$ exceeds the corresponding threshold value, it is judged that the balancing apparatus 400 has a defect that seriously reduces the vibration transmitted from the reference body 600 to the right and left vibration pick-ups 155R and 155L. In this case, the CPU 202 provides a warning to the operator through, for example, a display unit (not shown), and then terminates the test mode operation.

On the contrary, if all of the deviations $\delta_1$, $\delta_2$, $\delta_3$ and $\delta_4$ are within the corresponding threshold values, the same process is repeated by sending the X and Y right weight left vibration data and the X and Y right weight right vibration data, which are held in the memory device 204, to the right and left piezoelectric actuators 156R and 156L. This time, the deviation of the output signals of the right and left vibration pick-ups 155R and 155L are obtained using the following equations;

$$\delta_1 = \frac{1}{M} \sum_{m=1}^{M} (W_{LX}(2\pi m/M) - M_{RLX}(2\pi m/M))^2 \qquad (12)$$

$$\delta_2 = \frac{1}{M} \sum_{m=1}^{M} (W_{LY}(2\pi m/M) - M_{RLY}(2\pi m/M))^2 \qquad (13)$$

$$\delta_3 = \frac{1}{M} \sum_{m=1}^{M} (W_{RX}(2\pi m/M) - M_{RRX}(2\pi m/M))^2 \qquad (14)$$

$$\delta_4 = \frac{1}{M} \sum_{m=1}^{M} (W_{RY}(2\pi m/M) - M_{RRY}(2\pi m/M))^2 \qquad (15)$$

where $M_{RLX}(2\pi m/M)$, $M_{RLY}(2\pi m/M)$, $M_{RRX}(2\pi m/M)$ and $M_{RRL}(2\pi m/M)$ represent X and Y right weight left vibration data and X and Y right weight right vibration data, respectively.

Again, if one of the deviations $\delta_1$, $\delta_2$, $\delta_3$ and $\delta_4$ exceeds the corresponding threshold value, the CPU 202 provides a warning to the operator and then terminates the test mode operation. On the contrary, if all of the deviations $\delta_1$, $\delta_2$, $\delta_3$ and $\delta_4$ are within the corresponding threshold values, it is judged that the balancing apparatus 400 has no defect and the CPU 202 provides this result to the operator through, for example, the display unit. Then, the test mode operation terminates.

The calibration mode of the balancing apparatus 400 of the second embodiment of the present invention will now be described. The calibration mode modifies the constant coefficients $a_1$, $a_2$, $a_3$ and $a_4$, in order to prevent measurement error caused by changes in sensitivity of the right and left vibration pick-ups 155R and 155L that may be caused, for example, by variation of ambient temperature. Note that, the calibration mode is preferably carried out only when the test mode has not found a defect of the balancing apparatus 400.

In calibration mode, the reference body 600 is placed on the first and second pairs of rollers 114 and 116 and rotated at a revolving speed of N rpm. Then, the table 104, and hence the reference body 600, is vibrated by providing the X and Y left weight left vibration data and also the X and Y left weight right vibration data to the right and left piezoelectric actuators 156R and 156L via the first, second, third and fourth D/A converters 206, 208, 210 and 212. As a result, the table 104 is caused to vibrate. The vibration caused is substantially identical to the vibration caused by the reference body 600 having the weight at the left end of the main portion 602 thereof although no weight is attached thereto.

Next, the CPU 202 calculates the vectors $f_{L1}$ and $f_{R1}$ from the output signals currently generated by the right and left vibration pick-ups 155R, 155L ($W_{LX}(\theta)$, $W_{LY}(\theta)$, $W_{RX}(\theta)$ and $W_{RY}(\theta)$). Then, the constant coefficients $a_1$ and $a_3$ are determined by substituting the obtained vectors $f_{L1}$ and $f_{R1}$ into equations (3) and (4). Next, the old values of the constant coefficients $a_1$ and $a_3$ held in the memory device 204 are replaced with the new values. In this way, the modification of the constant coefficients $a_1$ and $a_3$ is carried out.

Next, the CPU 202 sends the X and Y right weight left vibration data and also the X and Y right weight right vibration data to the right and left piezoelectric actuators 156R, 156L. In this way, the table 104 is caused to vibrate. The vibration caused is substantially identical to the vibration generated by the reference body 600 having the weight at the right end of the main portion 602 thereof.

Next, the CPU 202 calculates the vectors $f_{L2}$ and $f_{R2}$ from the output signals currently generated by the right and left vibration pick-ups 155R and 155L ($W_{LX}(\theta)$, $W_{LY}(\theta)$, $W_{RX}(\theta)$ and $W_{RY}(\theta)$). Then, the constant coefficients $a_2$ and $a_4$ are determined by substituting the obtained vectors $f_{L2}$ and $f_{R2}$ into equations (6) and (7). Then, the old values of the constant coefficients $a_2$ and $a_4$ in the memory device 204 are replaced with the new values.

After saving the constant coefficients $a_2$ and $a_4$, the operation of the calibration mode terminates.

The measuring mode of the balancing apparatus 400 of the second embodiment of the present invention will now be described.

In this mode, the test body 500 having unknown dynamic balance is placed on the first and second pairs of rollers 114 and 116 and rotated at a revolving speed of N rpm. The test body rotating at N rpm vibrates due to the dynamic imbalance thereof. The right and left vibration pick-ups 155R and 155L detect the vibration of the test body via the table 104 and generate output signals $W_{LX}(\theta)$, $W_{LY}(\theta)$, $W_{RX}(\theta)$ and $W_{RY}(\theta)$. The CPU 202 receives the output signals of the right and left vibration pick-ups 155R and 155L and determines therefrom the vectors $f_L$ and $f_R$ of the forces exerted on the first and second rollers 114 and 116 from the test body 600. Then, the vectors $f_L$ and $f_R$, and also the constant coefficients $a_1$, $a_2$, $a_3$ and $a_4$ held in the memory device 204 are substituted into equation (1). As a result, the vectors $U_L$ and $U_R$ indicating the dynamic imbalance of the test body can be obtained.

While the present invention has been described with particular reference to its preferred embodiments, it will be understood by those skilled in the art that changes may be made and equivalents may be substituted for elements of the preferred embodiments without departing from the present invention. In addition, modifications may be made to adapt a particular situation and material to a teaching of the present invention without departing from the essential teachings of the present invention. For example, in the first embodiment of the present invention, the ideal dynamic imbalance of the ideal crank shaft can be divided into a plurality of pieces of ideal dynamic imbalance each defined on a balancing plane defined at a different crank pin of the crank shaft. Each piece of ideal dynamic imbalance generates in the vibration member a particular vibration as the crank shaft rotates, which can be canceled with the inverse vibration thereof.

In the first embodiment of the present invention, the data of each inverse vibration may be stored into the memory device of the balancing apparatus, and the piezoelectric actuators may be operated to generate in the vibration member a composite vibration of the inverse vibrations held in the memory device.

A plurality of crank pin sensors may be further provided to the balancing apparatus of the first embodiment of the present invention, which crank pin sensors detect an angular position of respective ones of the crank pins of the rotating crank shaft. The composite vibration of the inverse vibrations may be generated taking into account the angular positions of the crank pins detected by the crank pin sensors so as to decrease errors in dynamic imbalance measurement due to the effect of angular positional error of the crank pins of the crank shaft to be measured.

The present disclosure relates to the subject matters contained in Japanese Patent Applications No. P2002-141486, filed on May 16, 2002, and No. P2002-164232, filed on Jun. 5, 2002, which are expressly incorporated herein by reference in their entireties.

What is claimed is:

1. A method for measuring dynamic imbalance of a body, comprising:

rotating a test body having unknown dynamic imbalance to generate a first vibration in the test body;

said first vibration being transmitted from the test body to a vibration member;

applying a second vibration to the vibration member, the second vibration being adjusted to cancel vibration generated in the vibration member if the test body has ideal dynamic imbalance;

detecting any vibration of the vibration member.

2. The method according to claim 1, further comprising preparing data for generating the second vibration in a memory device in advance of applying the second vibration to the vibration member.

3. The method according to claim 2, wherein preparing data for generating the second vibration includes:

rotating a standard body having the ideal dynamic imbalance;

transmitting vibration generated in the standard body to the vibration member;

detecting the vibration of the vibration member; and storing data of the detected vibration into the memory device.

4. A method for calibrating balancing apparatus, the balancing apparatus applying vibration to a vibration member by rotating a test body, detecting the vibration of the vibration member, and carrying out a process for determining dynamic imbalance of the test body from the detected vibration, said method comprising:

arranging a reference body such that vibration of the reference body transmits to the vibration member, said reference body having no dynamic imbalance;

rotating the reference body;

detecting vibration of the vibration member while applying reference vibration to the vibration member, the reference vibration being substantially identical to vibration generated in the vibration member by rotating the reference body provided with a weight at a predetermined location; and modifying a coefficient utilized in the process for determining the dynamic imbalance based on the vibration detected while applying reference vibration to the vibration member.

5. The method according to claim 4, further comprising:

rotating the reference body provided with the weight at the predetermined location to vibrate the vibration member;

detecting the vibration of the vibration member;

storing data of the detected vibration into a memory device; and generating the reference vibration from the data held in the memory device.

6. A method for testing balancing apparatus that determines dynamic balance of a test body by generating vibration in a vibration member by rotating the test body, and detecting the vibration of the vibration member by a sensor, the method comprising:

arranging a reference body such that vibration of the reference body transmits to the vibration member, said reference body having no dynamic imbalance;

rotating the reference body;

detecting vibration of the vibration member while applying reference vibration to the vibration member, the reference vibration being substantially identical to vibration generated in the vibration member by rotating the reference body provided with a weight at a predetermined location; and determining whether the balancing apparatus has a defect that seriously reduces the vibration transmitted from the reference body to the sensor by comparing the vibration detected by the sensor with the reference vibration.

7. The method according to claim 6, wherein determining whether the balancing apparatus has the defect includes:

calculating deviation of the vibration detected by the sensor from the reference vibration; and comparing the deviation with a predetermined threshold.

8. The method according to claim 6, further comprising providing a warning to an operator of the balancing apparatus when it is determined that the balancing apparatus has the defect.

9. The method according to claim 6, further comprising:

rotating the reference body provided with the weight at the predetermined location to vibrate the vibration member;

detecting the vibration of the vibration member;

storing data of the detected vibration into a memory device; and generating the reference vibration from the data held in the memory device.

10. The method according to claim 6, further comprising:

carrying out modification a coefficient utilized in a processing for determining the dynamic imbalance of the test body from output of the sensor, said modification being carried out when it is determined the balancing apparatus does not have the defect.

11. A balancing apparatus, comprising:

a rotating mechanism for rotating a body to be measured;

a vibration member for being vibrated by the body being rotated by said rotating mechanism;

a sensor for detecting vibration of said vibration member; and a vibrator coupled to said vibration member for vibrating said vibration member, wherein said vibrator applies to said vibration member a vibration, which is an inverse of a vibration that will be caused to said vibration member by an ideal body having an ideal dynamic imbalance, wherein said vibrator vibrates said vibration member so as to cancel a predetermined vibration of said vibration member, and wherein, in use, said sensor detects composite vibration generated in said vibration member by said body and said vibrator.

12. The balancing apparatus according to claim 11, further comprising a memory device for holding data representing vibration which will be generated in said vibration member by the ideal body, wherein said vibrator vibrates said vibration member based on the data held in said memory device.

13. The balancing apparatus according to claim 12, wherein said data in said memory device is prepared from vibration detected by said sensor when said vibration member is vibrated by the ideal body mounted to and rotated by said rotating mechanism.

14. A balancing apparatus, comprising:

a rotating mechanism for rotating a body to be measured;

a vibration member for being vibrated by the body being rotated by said rotating mechanism;

a sensor for detecting vibration of said vibration member;

a vibrator coupled to said vibration member for vibrating said vibration member; and a controller for determining whether said balancing apparatus has a defect that seriously reduces the vibration transmitted from the body to said sensor, based on vibration detected by said sensor while said vibrator is applying a reference vibration to said vibration member, wherein said vibrator vibrates said vibration member so as to cancel a predetermined vibration of said vibration member, and wherein, in use, said sensor detects composite vibration generated in said vibration member by said body and said vibrator.

15. The balancing apparatus according to claim 14, further comprising a memory device for holding data for generating said reference vibration.

16. A balancing apparatus, comprising:

a rotating mechanism for rotating a body to be measured;

a vibration member for being vibrated by the body being rotated by said rotating mechanism;

a sensor for detecting vibration of said vibration member;

a vibrator coupled to said vibration member for vibrating said vibration member; and a processor for carrying out calculation for determining dynamic imbalance of the body from output of said sensor, wherein said vibrator vibrates said vibration member so as to cancel a predetermined vibration of said vibration member, wherein, in use, said sensor detects composite vibration generated in said vibration member by said body and said vibrator, and wherein said processor performs modification of a coefficient utilized in said calculation, said modification being carried out based on output of said sensor while said rotating mechanism is rotating a dynamically balanced reference body as well as said vibrator is applying to said vibration member a reference vibration, said reference vibration being substantially identical to vibration that will be caused to said vibration member by rotating the reference body provided with a weight at a predetermined location.

17. The balancing apparatus according to claim 16, further comprising a memory device for holding data for generating said reference vibration.

18. A balancing apparatus, comprising:

a rotating mechanism for rotating a body to be measured;

a vibration member for being vibrated by the body being rotated by said rotating mechanism;

a sensor for detecting vibration of said vibration member;

a memory device for holding data of the vibration detected by said sensor;

a vibrator coupled to said vibration member for applying vibration thereto; and a controller having first and second operation modes, said controller in said first operation mode storing data of the vibration detected by said sensor into said memory device while keeping said vibrator out of operation, said controller in said second operation mode vibrating said vibration member by controlling said vibrator based on said data held said memory device.

* * * * *